US008456490B2

(12) United States Patent
Feng et al.

(10) Patent No.: US 8,456,490 B2
(45) Date of Patent: Jun. 4, 2013

(54) IMAGE ZOOMING METHOD FOR SHIFTING NON-DYNAMIC IMAGE AND SETTING SIZE OF NON-DYNAMIC IMAGE EXECUTED BY COMPUTING DEVICE

(75) Inventors: Pei-Hua Feng, Zhejiang (CN); Dong-Qiang Cai, Zhejiang (CN)

(73) Assignee: ArcSoft Hangzhou Co., Ltd., Hangzhou, Zhejiang (CN)

( * ) Notice: Subject to any disclaimer, the term of this patent is extended or adjusted under 35 U.S.C. 154(b) by 362 days.

(21) Appl. No.: 12/637,306

(22) Filed: Dec. 14, 2009

(65) Prior Publication Data
US 2010/0171764 A1 Jul. 8, 2010

(51) Int. Cl.
*G09G 5/00* (2006.01)
*G06F 3/0481* (2006.01)
*G06F 3/0488* (2006.01)
*G06T 11/60* (2006.01)
*G06T 3/40* (2006.01)

(52) U.S. Cl.
CPC ............ *G06F 3/0481* (2013.01); *G06F 3/0488* (2013.01); *G06T 11/60* (2013.01); *G06T 3/40* (2013.01)
USPC ............ 345/660; 345/661; 345/672; 345/173

(58) Field of Classification Search
CPC ....... G06F 3/0481; G06F 3/0488; G06T 11/60; G06T 3/40
USPC ............ 345/660, 672; 382/173; 348/240.02, 348/333.01
See application file for complete search history.

(56) References Cited

U.S. PATENT DOCUMENTS

| 6,491,628 | B1* | 12/2002 | Kobayashi | 600/168 |
|---|---|---|---|---|
| 6,587,119 | B1* | 7/2003 | Anderson et al. | 345/672 |
| 2001/0013897 | A1* | 8/2001 | Kowno et al. | 348/240 |
| 2002/0093578 | A1* | 7/2002 | Kowno et al. | 348/241 |
| 2003/0122853 | A1* | 7/2003 | Kim | 345/660 |
| 2005/0068342 | A1* | 3/2005 | Ouchi et al. | 345/684 |
| 2005/0195157 | A1* | 9/2005 | Kramer et al. | 345/156 |
| 2005/0210380 | A1* | 9/2005 | Kramer et al. | 715/518 |
| 2005/0219393 | A1* | 10/2005 | Sugimoto | 348/333.01 |
| 2006/0247855 | A1* | 11/2006 | de Silva et al. | 701/212 |
| 2008/0030609 | A1* | 2/2008 | Hasegawa | 348/333.01 |
| 2008/0036793 | A1* | 2/2008 | Wang | 345/661 |
| 2008/0260248 | A1* | 10/2008 | Kondo et al. | 382/173 |
| 2008/0273098 | A1* | 11/2008 | Ito | 348/240.2 |

FOREIGN PATENT DOCUMENTS

CN 1940921 A 4/2007

OTHER PUBLICATIONS

Hoad et al., "Automatic Control of Camera Pan, Zoom and Focus for Improving Object Recognition", Image Processing and its Applications, IEE, Jul. 1995, pp. 291-295.*

* cited by examiner

*Primary Examiner* — Jin-Cheng Wang
(74) *Attorney, Agent, or Firm* — Muncy, Geissler, Olds & Lowe, PLLC (57) ABSTRACT

An image zooming method for adjusting an image in a monitor display area includes the steps of setting at least one focus region in the image in the monitor displaying area; obtaining a focus center in accordance with the focus region; setting a zooming rate of the image; obtaining a shift vector in accordance with a display center of the monitor display area, the focus center and the zooming rate; and shifting the image in the monitor display area in accordance with the shift vector, and setting the size of the image in the monitor display area in accordance with the zooming rate.

6 Claims, 8 Drawing Sheets

IMAGE ZOOMING METHOD FOR SHIFTING NON-DYNAMIC IMAGE AND SETTING SIZE OF NON-DYNAMIC IMAGE EXECUTED BY COMPUTING DEVICE

CROSS REFERENCE TO RELATED APPLICATIONS

This Non-provisional application claims priority under 35 U.S.C. §119(a) on Patent Application No(s). 200910001748.2 filed in People's Republic of China on Jan. 4, 2009, the entire contents of which are hereby incorporated by reference.

BACKGROUND OF THE INVENTION

1. Field of Invention

The present invention relates to a zooming device and zooming method and, in particular, to an image zooming device and image zooming method.

2. Related Art

Accompanying the progressive of digital technology, the information can be easily carried around and the user is able to make, view, and modify digital information easily.

The commonly used function such as viewing the image is that, after the image file is opened by the electronic product, the image is displayed in the monitor display area for the user to view. The user may zoom in or zoom out the image as s/he pleases. However, the image is usually zoomed in or zoomed out around the center of the image or the center of the monitor display area.

Figure 1A:
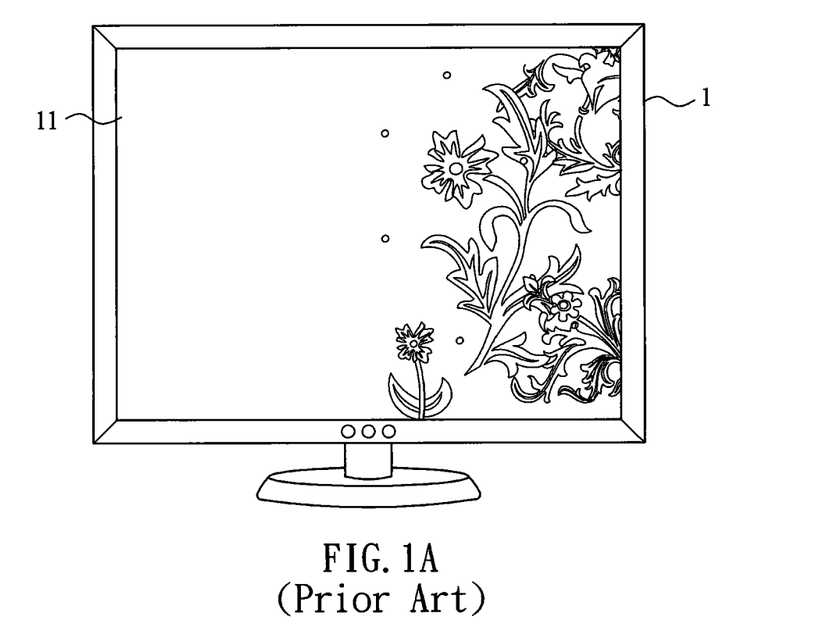
FIGS. 1A and 1B are schematic views of zooming in an image conventionally.
Figure 1B:
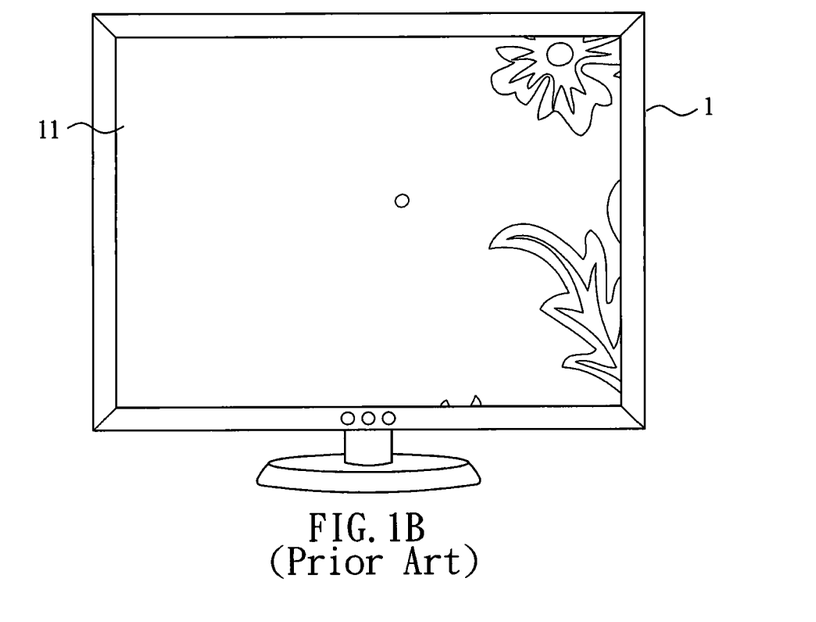

FIGS. 1A and 1B are schematic views of zooming in an image conventionally. With reference to FIG. 1A, when an image is opened in a display 1, the entire image is displayed in the monitor display area. At this time, the object in the image is smaller and located on the right hand side of the monitor display area. When the user desires to zoom in the image to view the object, the image is zoomed in around the center of the image, as shown in FIG. 1B. At this time, the object in the image is not in the center of the monitor display area 11 and a part of the image object is not in the monitor display area 11. Hence the user has to adjust the image so as to move the object into the monitor display area 11.

As mentioned above, after zooming in or zooming out the image, the user usually needs to adjust the image to view the object. By doing so, the user needs to drag the image many times for viewing the object in the image and this is very inconvenient for the user.

Therefore, it is an important subject of the present invention to provide an image zooming device and image zooming method that the user can easily view the object in the image after zooming in or zooming out the image.

SUMMARY OF THE INVENTION

In view of the foregoing, the present invention is to provide an image zooming device and image zooming method that when an image is zoomed in or zoomed out in a monitor display area, the object can be automatically focused and displayed in the monitor display area, such that a user may avoid dragging the display image many times so as to easily view the object in the image.

To achieve the above, the present invention is to provide an image zooming method that an image is adjusted in a monitor display area. The image zooming method includes the steps of setting at least one focus region in the image in the monitor display area; obtaining a focus center in accordance with the focus region; setting a zooming rate of the image; obtaining a shift vector in accordance with the center of the monitor display area, the focus center and zooming rate; and shifting the image in the monitor display area in accordance with the shift vector and setting the size of the image in the monitor display area in accordance with the zooming rate.

To achieve the above, the present invention is to provide an image zooming device applied with an image in a monitor display area. The image zooming device includes a focus region setting module, a focus center calculating module, a zooming rate setting module, a shift vector calculating module, and an implementation module. The focus region setting module sets at least one focus region in the image in the monitor display area. The focus center calculating module obtains a focus center in accordance with the focus region. The zooming rate setting module sets the zooming rate of the image. The shift vector setting module obtains a shift vector in accordance with the center of the monitor display area, the focus center and zooming rate. The implementation module shifts the image in the monitor display area in accordance with the shift vector and sets the size of the image in the monitor display area in accordance with the zooming rate.

In a preferred embodiment of the present invention, the focus region is set by object recognition method. The object recognition method may be face recognition method, moving object recognition method, building recognition method, or landscape recognition method.

As mentioned above, the image zooming device and image zooming method according to the present invention set the focus region in the image by the object recognition method (e.g. the face recognition method, moving object recognition method, building recognition method, or landscape recognition method), and the focus center may be obtained according to the focus region. After the shift vector is calculated, the focus center moves toward the center of the monitor display area, such that after the user zooms in or zooms out the image, the object in the image may be automatically presented in the monitor display area. Hence the user may avoid dragging the image many times so as to easily view the object in the image.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 2:
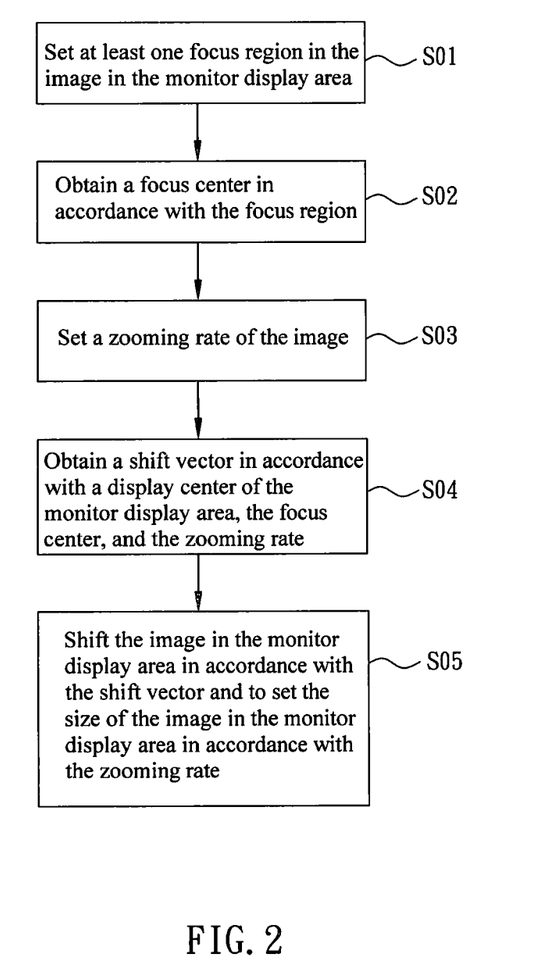
FIG. 2 is a flowchart of an image zooming method according to a preferred embodiment of the present invention.

FIG. 2 is a flowchart of an image zooming method according to a preferred embodiment of the present invention. With reference to FIG. 2, the image zooming method includes steps S01 to S05. The image zooming method is to adjust an image in a monitor display area.

Step S01 is to set at least one focus region in the image in the monitor display area. The focus region may be a single object or a plurality of objects in the image. In the embodiment, the focus region is obtained and set by the object recognition method or may be any region selected by the user, but not limited to this. The object recognition method may be, for example, a face recognition method, an animal recognition method, a building recognition method, or a landscape recognition method. However, if there are different objects such as people and buildings in the image, the user may decide the priority of the recognition methods.

Step S02 is to obtain a focus center in accordance with the focus region. In the embodiment, when the image has only one focus region, the focus center is preset as the center of the focus region. If the image has a plurality of focus regions, the focus center is a point obtained by a calculating program in the image according to the focus regions. The focus center may be, for example, the center point of the circumscribed rectangle of the focus regions or the center point of the focus regions. The weights of the focus regions for calculating the center point are corresponding to the areas of the effective focus regions, which are the focus regions in the monitor display area.

Step S03 is to set a zooming rate of the image. In the embodiment, the zooming rate may be a preset value or set by the user.

Step S04 is to obtain a shift vector in accordance with a display center of the monitor display area, the focus center, and the zooming rate. In the embodiment, the shift vector is a parameter of shifting direction and shifting distance of the image focus center in the monitor display area. It is noted that in addition to the center of the monitor, the display center may be any position set by the user in the monitor display area in another embodiment. Additionally, it is worth to be mentioned that the display center may be where the image is displayed. In other words, the position of the image in the display center before zooming is the position of the other image after zooming. Furthermore, the shift vector has a zooming-panning rate, which will be described as follows.

Step S05 is to shift the image in the monitor display area in accordance with the shift vector and to set the size of the image in the monitor display area in accordance with the zooming rate. In the embodiment, the image shifts toward a set point in the monitor display area in accordance with the shift vector, and the set point is, for example, a position set by the user or the center of the monitor display area.

Figure 3:
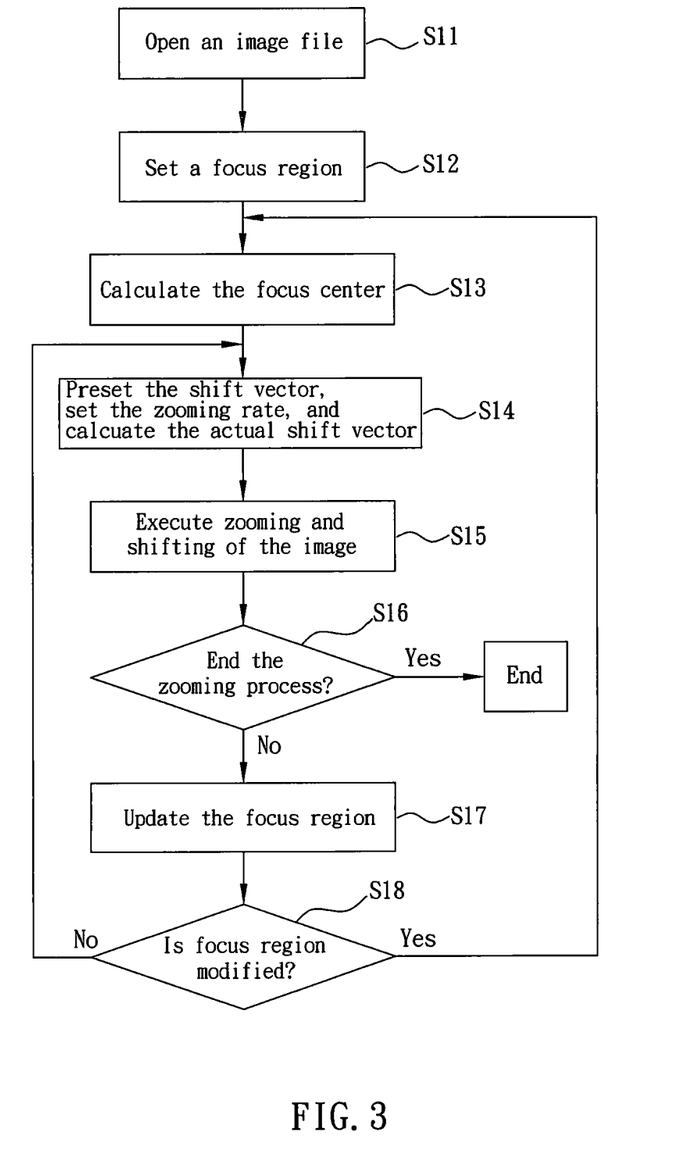
FIG. 3 is a flowchart further illustrating the image zooming method according to the preferred embodiment of the present invention.
Figure 4A:
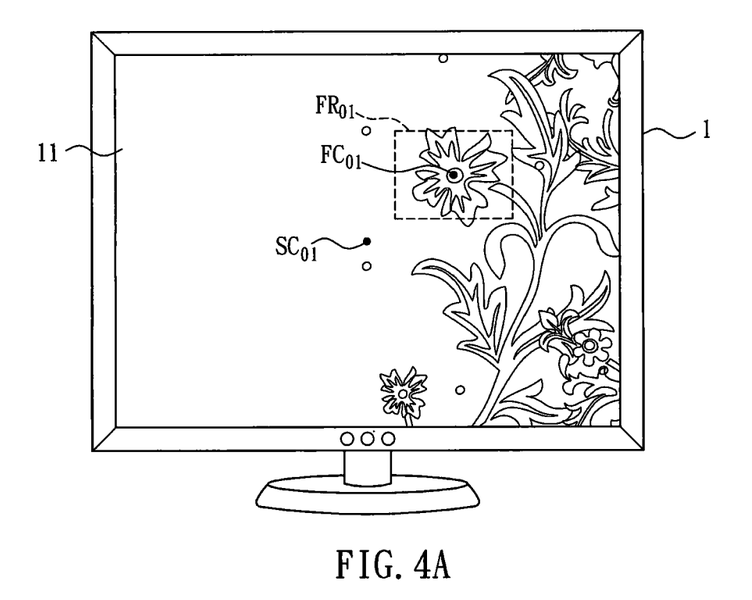
FIGS. 4A to 4C are schematic views of zooming in a single focus region in the image according to the preferred embodiment of the present invention.
Figure 4B:
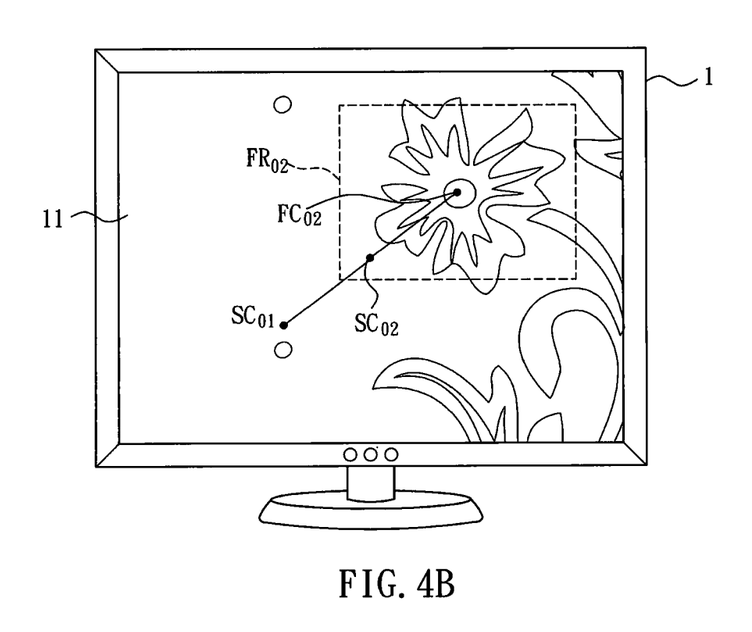
Figure 4C:
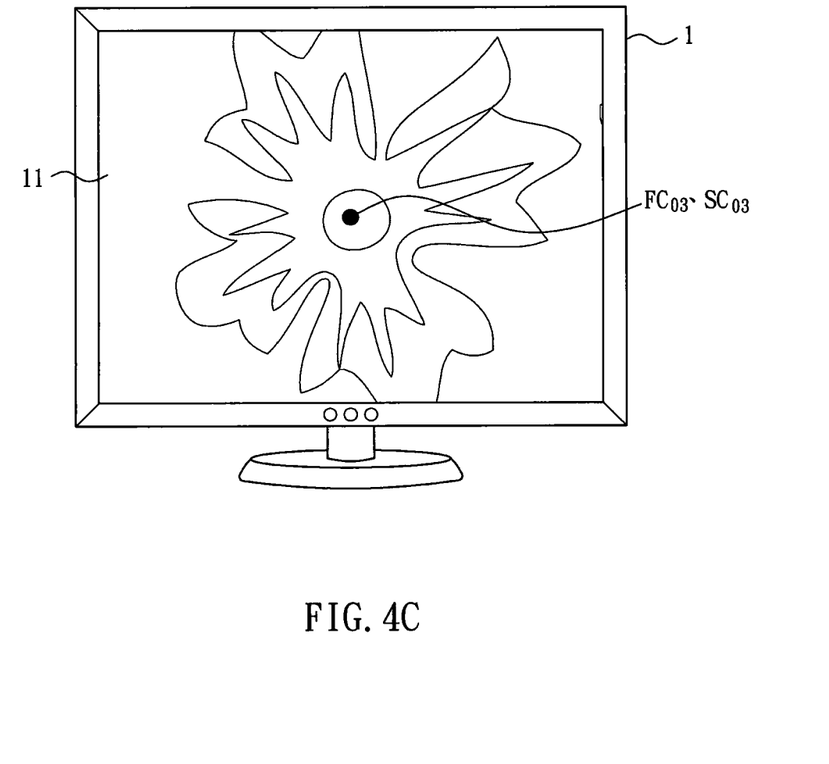

The image zooming method according to the preferred embodiment of the present invention is further illustrated with the following two examples and the method for zooming in the image is used for illustration. FIG. 3 is a flowchart illustrating the image zooming method according to the preferred embodiment of the present invention and FIGS. 4A to 4C are schematic views of zooming in a single focus region in the image according to the preferred embodiment of the present invention. FIGS. 3 and 4A to 4C are used to illustrate the first example.

As shown in FIG. 4A, step S11 is to open an image file in the monitor display area 11 of the display 1. The entire image is displayed in the monitor display area 11 and the image size is 25% for example.

Step S12 is to set a focus region $FR_{01}$ in the monitor display area 11 and step S13 is to calculate the focus center $FC_{01}$ in accordance with the focus region $FR_{01}$. In the embodiment, since it is a single focus region, the focus center $FC_{01}$ is the center of the focus region $FR_{01}$.

Step S14 is to preset the shift vector. The direction of the shift vector is preset from the focus center $FC_{01}$ to the display center $SC_{01}$ and the length of the shift vector is delta/50, in which delta is the distance between the focus center $FC_{01}$ and the display center $SC_{01}$. The zooming rate setting module sets the zooming rate and determines the actual shift vector in accordance with the zooming rate and the preset shift vector.

In the embodiment, the zooming-panning rate of the shift vector is shown as follows:

(delta/50)×(zooming rate difference)

wherein, delta is the distance between the display center $SC_{01}$ and the focus center $FC_{01}$, and the zooming rate difference is the difference of the image zooming rates before and after zooming. In the embodiment, the image is zoomed in from 25% to 50% for example, and the zooming-panning rate is (delta/50)×(50−25)=delta/2 in this case.

Step S15 is to execute zooming and shifting of the image. The image is shifted in the monitor display area 11 in accordance with the shift vector and the size of the image in the monitor display area 11 is set in accordance with the zooming rate. As shown in FIG. 4B, since the zooming-panning rate is delta/2, the display center $SC_{02}$ is located at the midpoint between the original display center $SC_{01}$ and the focus center $FC_{02}$. Because the image is zoomed in from 25% to 50%, the focus region $FR_{01}$ in the monitor display area 11 is set to be a focus region $FR_{02}$ twice as large as the original focus region $FR_{01}$, and the original focus center $FC_{01}$ relatively becomes the focus center $FC_{02}$.

After that, step S16 is to determine whether to end the zooming process. If "Yes", the program ends; if "No", step S17 is executed.

Step S17 is to update the focus region, that is, to reset the focus region $FR_{02}$. A single focus region is used as an example in the embodiment, such that the positions of the focus region and focus center in the image remain the same. However, the zooming rate of the image in the monitor display area varies, hence the position of the focus center in the monitor display changes after zooming.

Step S18 is to determine whether the focus region is modified. If "Yes", step S13 is executed and the focus center $FC_{02}$ is calculated; if "No", step S14 is executed.

Step S14 is to reset the shift vector. The direction of the shift vector is from $FC_{02}$ to $SC_{02}$ and the length of the shift vector is delta/50, in which delta is the distance between the current display center and focus center, which means, delta is the distance between $SC_{02}$ and $FC_{02}$.

If the image is zoomed in to 100% for example, the zooming-panning rate is (delta/50)×(100−50)=delta. Thus, as shown in FIG. 4C, the focus center $FC_{03}$ of the focus region overlaps the display center $SC_{03}$ after zooming and shifting the image.

FIGS. 5A to 5D are schematic views of zooming in a plurality of focus regions in the image according to a preferred embodiment of the present invention. With reference to FIGS. 5A to 5D, a second example is illustrated. A plurality of focus regions are used in the second example.

Figure 5A:
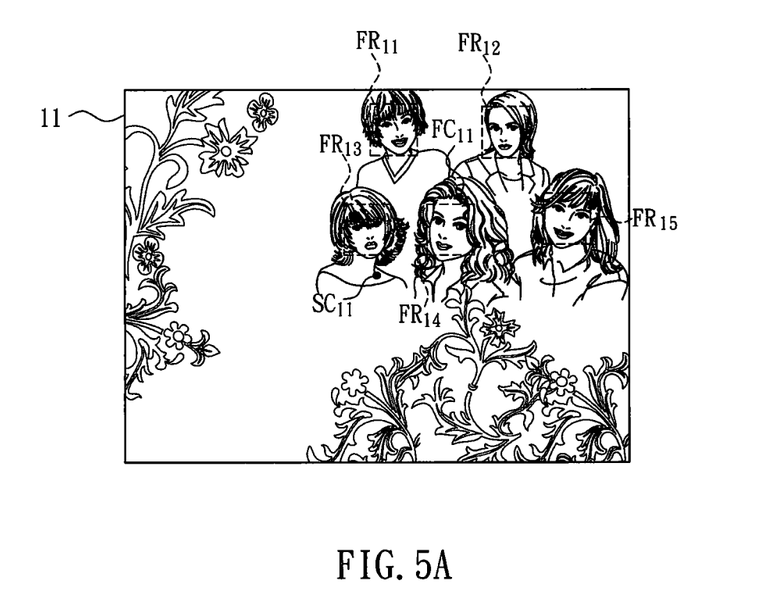
FIGS. 5A to 5D are schematic views of zooming in a plurality of focus regions in the image according to a preferred embodiment of the present invention.

As shown in FIG. 5A, an image is opened in the monitor display area 11 and the entire image is displayed in the monitor display area 11. At this time, the image size is 25% for example.

Next, the focus regions $FR_{11}$, $FR_{12}$, $FR_{13}$, $FR_{14}$, and $FR_{15}$ are set and the focus center $FC_{11}$ is calculated in accordance with these focus regions $FR_{11}$ to $FR_{15}$. In the embodiment, the face recognition method is used for example and the focus regions are the human faces in the image. The face recognition technology can be found in many publications, for example, the OpenCV software for face detection is designed according to the Adaboost algorithm, Haar wavelet feature, and related recognition technology. The OpenCV software has a human face recognizer (i.e. the recognizer for determining the image is whether a human face or not) and an effective Haar wavelet feature that acquires the human face, eyes, nose, and mouth based on a large amount of human face image samples, hence to quickly detect and recognize the face, eyes, nose, and mouth in the digital image.

Then, the shift vector is reset. The direction of the shift vector is from the focus center $FC_{11}$ to the display center $SC_{11}$. The length of the shift vector may be adjusted in accordance with the actual demand and, in this case, the length of the preset shift vector is delta/50, in which delta is the distance between the focus center $FC_{11}$ and the display center $SC_{11}$.

Figure 5B:
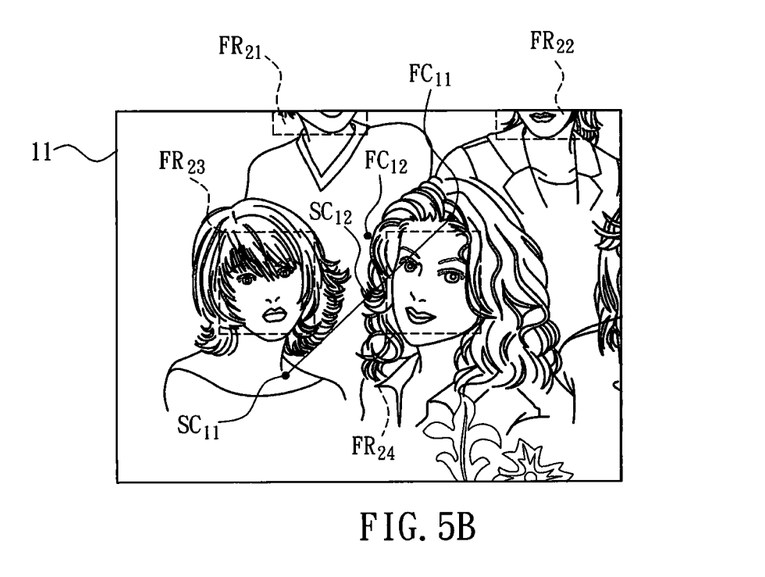

The zooming rate setting module sets the zooming rate (e.g. zooming in to 50%) and hence the required zooming-panning rate of the actual shift vector is (delta/50)×(50−25)=delta/2 in this case. Therefore, after shifting and zooming in the image, as shown in FIG. 5B, the display center $SC_{12}$ in the monitor display area 11 is at the midpoint of the original display center $SC_{11}$ and the focus center $FC_{11}$.

Since the image alters after completing the image shifting and zooming, the focus regions $FR_{21}$, $FR_{22}$, $FR_{23}$, and $FR_{24}$ are updated. However, parts of the focus regions of $FR_{21}$ and $FR_{22}$ are not in the monitor display area 11, hence only parts of the focus regions in the monitor are valid. Because the entire original focus region $FR_{15}$ is not in the monitor display area 11, it is invalid and the focus region $FR_{25}$ does not exist. The focus center $FC_{12}$ is recalculated in accordance with the new focus regions $FR_{21}$, $FR_{22}$, $FR_{23}$, and $FR_{24}$.

After that, the shift vector is reset. The direction of the shift vector is from the focus center $FC_{12}$ to the display center $SC_{12}$. The length of the shift vector is delta/50 and delta is the distance between the focus center $FC_{12}$ and the display center SC12.

Figure 5C:
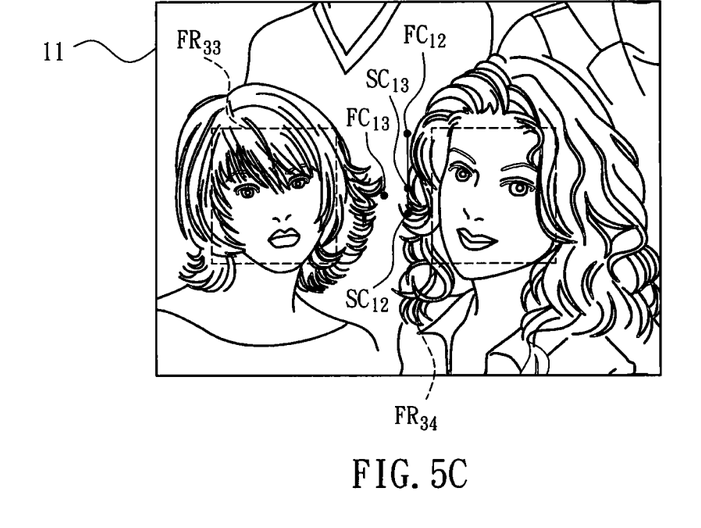

Next, the zooming rate is set again (e.g. to 66%) and the shift vector is determined. The zooming-panning rate of the shift vector is (delta/50)×(66−50)=delta/3 (only integer is taken in this case). Thus, as shown in FIG. 5C, after shifting and zooming in the image, the display center $SC_{13}$ of the monitor display area 11 is located on the ⅓ part between the original display center $SC_{12}$ and focus center $FC_{13}$. The focus region is updated and the new focus center FC14 is calculated in accordance with the new focus regions FR33 and FR34.

The shift vector is reset. The direction of the shift vector is from the focus center $FC_{13}$ to the display center $SC_{14}$. The length of the shift vector is delta/34 and delta is the distance between the focus center $FC_{14}$ and the display center $SC_{14}$.

Figure 5D:
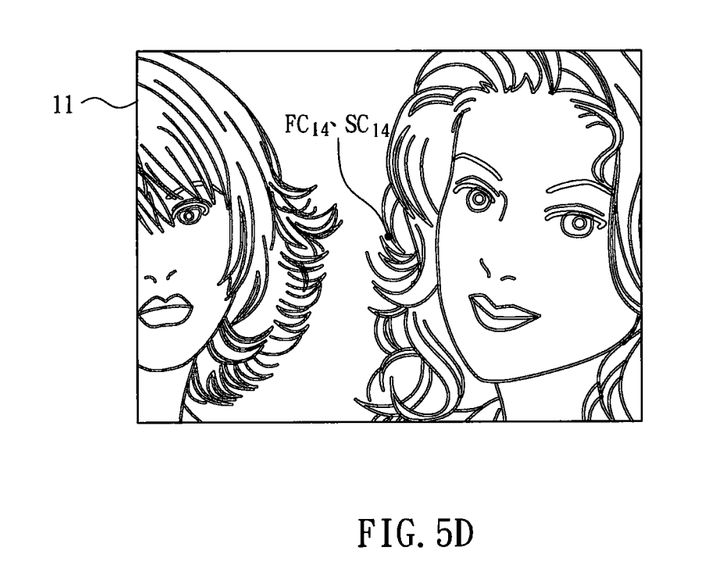

When the zooming rate is set (e.g. to 100%), the actual shift vector is (delta/34)×(100−66)=delta. As shown in FIG. 5D, as the image is zoomed in to 100%, the display center $SC_{14}$ overlaps the focus center $FC_{14}$.

Figure 6:
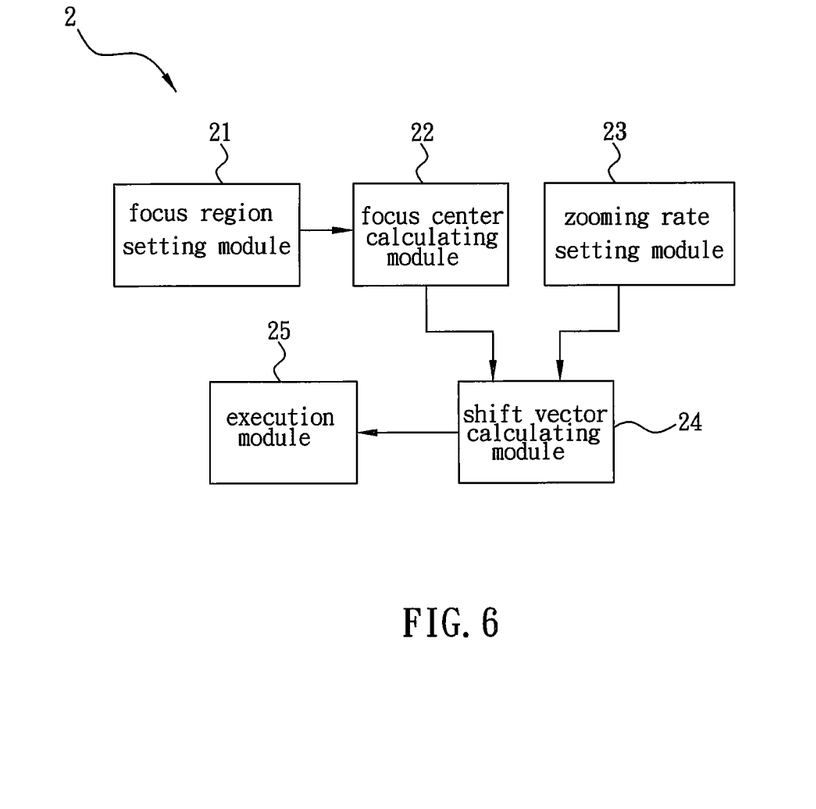
FIG. 6 is a schematic view of an image zooming device according to the preferred embodiment of the present invention.

FIG. 6 is a schematic view of an image zooming device according to the preferred embodiment of the present invention. With reference to FIG. 6, the image zooming device 2 is applied with the image in a monitor display area. The image zooming device 2 includes a focus region setting module 21, a focus center calculating module 22, a zooming rate setting module 23, a shift vector calculating module 24, and an execution module 25. The focus region setting module 21 is to set at least one focus region in the image. The focus center calculating module 22 is to obtain a focus center in accordance with the focus region. The zooming rate setting module 23 is to set the zooming rate of the image. The shift vector calculating module 24 is to obtain a shift vector in accordance with the center of the monitor display area, focus center and zooming rate. The execution module 25 is to shift the image in the monitor display area in accordance with the shift vector and to set the size of the image in the monitor display area in accordance with the zooming rate. The relative account has been illustrated in the above embodiment, thus a detailed description thereof will be omitted.

When the focus center and shift vector are calculated, the following rules are followed:

a. When there is only one focus region, the focus center is always the center of the focus region whether a part of the focus region is in the monitor display area or not.

b. Every focus region has a center and the monitor display area should contain as many centers of the focus regions as possible.

c. At least one center of the focus region must locate in the monitor display area at any time.

To sum up, the image zooming device and image zooming method according to the present invention is to set the focus region in the monitor display area by the object recognition method (e.g. the face recognition method, moving object recognition method, building recognition method, or landscape recognition method) and to obtain the focus center in accordance with the focus region(s). After calculating the shift vector, the focus center is shifted to the center of the monitor display area such that after the image is zoomed in or zoomed out by the user, the object in the image can be automatically displayed in the monitor display area as much as possible. Therefore, the user may avoid dragging the image many times and easily view the object in the image.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An image zooming method executed by a computing device for adjusting a non-dynamic image in a monitor display area, comprising the steps of:

setting at least one focus region in the non-dynamic image in the monitor display area;

obtaining a focus center in accordance with the focus region;

setting a zooming rate of the non-dynamic image;

obtaining a shift vector for the non-dynamic image in accordance with a display center of the monitor display area, the focus center and the zooming rate, wherein the shift vector represents shifting direction and shifting distance of the focus center in the monitor display area; and shifting the non-dynamic image in the monitor display area toward a set point in the monitor display area in accordance with the shift vector and setting the size of the non-dynamic image in the monitor display area in accordance with the zooming rate, wherein the set point is the center of the monitor display area or any position set according to application demands, wherein the shift vector is determined in accordance with the zooming rate and a preset shift vector, a direction of the preset shift vector is from the focus center to the display center and a length of the preset shift vector is a distance between the focus center and the display center divided by a parameter, wherein a zooming-panning rate of the shift vector is determined by the length of the preset shift vector multiplied by a zooming rate difference, and the zooming rate difference is the difference of the zooming rates before and after zooming.

2. The image zooming method according to claim 1, wherein the focus region is obtained and set by an object recognition method or any region selected by a user.

3. The image zooming method according to claim 2, wherein the object recognition method is a face recognition method, an animal recognition method, a moving object recognition method, a building recognition method, or a landscape recognition method.

4. The image zooming method according to claim 1, wherein the focus center is the center of the focus region.

5. The image zooming method according to claim 1, wherein after the step of setting the focus region in the non-dynamic image in the monitor display area, the non-dynamic image has a plurality of focus regions, and the focus center is obtained in accordance with the focus regions.

6. The image zooming method according to claim 5, wherein the focus center is the center point of the focus regions.

* * * * *

UNITED STATES PATENT AND TRADEMARK OFFICE
CERTIFICATE OF CORRECTION

PATENT NO.       : 8,456,490 B2
APPLICATION NO.  : 12/637306
DATED            : June 4, 2013
INVENTOR(S)      : Pei Hua Feng Page 1 of 1

It is certified that error appears in the above-identified patent and that said Letters Patent is hereby corrected as shown below:

Title Page, below item (22) please add the following:

(30) Foreign Application Priority Data
Jan. 4, 2009  (CN)........ 2009100017648.2

Signed and Sealed this
First Day of October, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,456,490 B2  
APPLICATION NO. : 12/637306  
DATED : June 4, 2013  
INVENTOR(S) : Pei Hua Feng Page 1 of 1

It is certified that error appears in the above-identified patent and that said Letters Patent is hereby corrected as shown below:

Title Page, below item (22) please add the following:

(30) Foreign Application Priority Data  
Jan. 4, 2009 (CN)........ 200910001748.2

This certificate supersedes the Certificate of Correction issued October 1, 2013.

Signed and Sealed this  
Nineteenth Day of November, 2013

Teresa Stanek Rea  
*Deputy Director of the United States Patent and Trademark Office*